D. H. KLEINSCHMIDT.
EVAPORATING APPARATUS.
APPLICATION FILED JUNE 11, 1918.

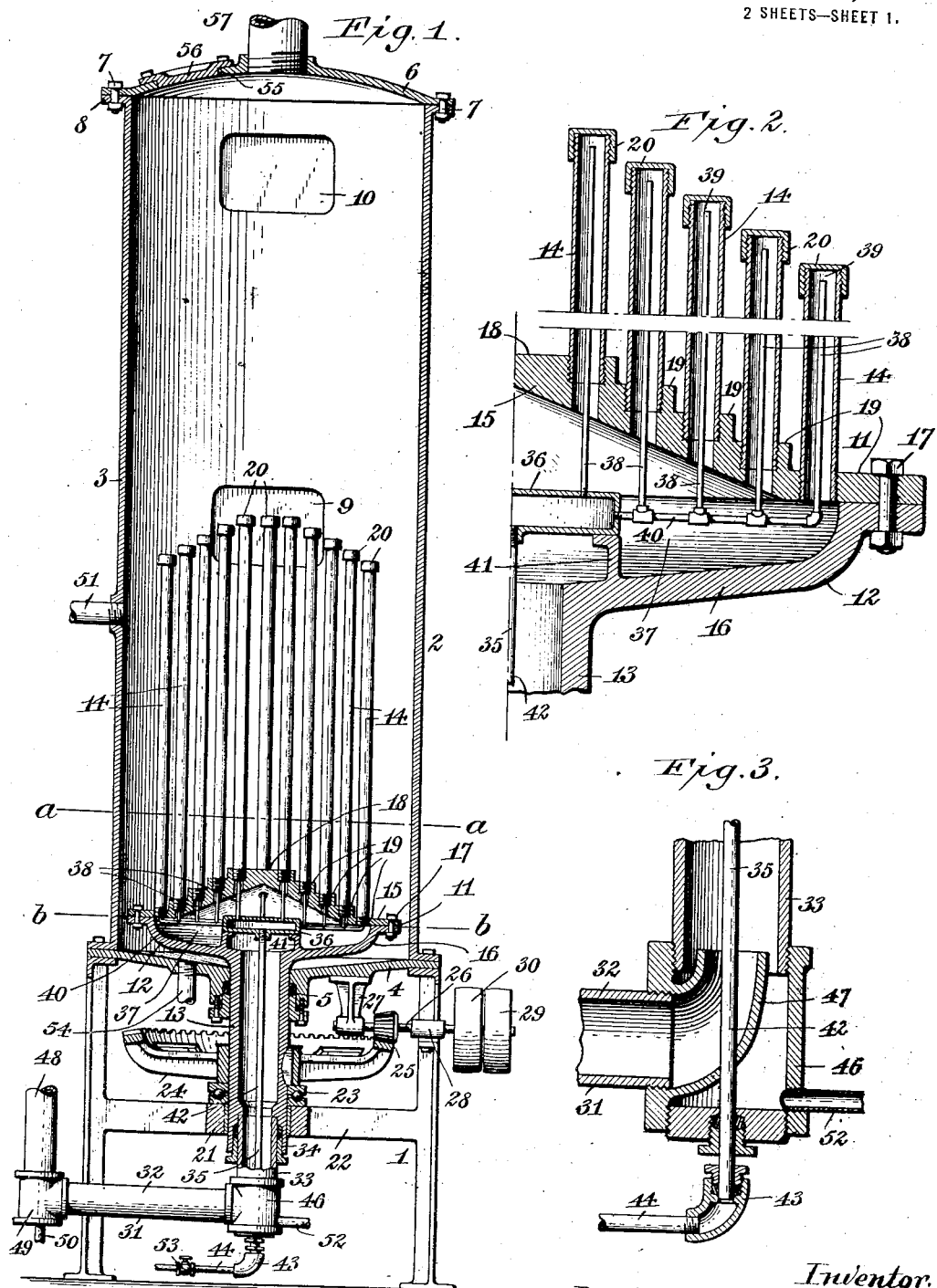

1,412,531.

Patented Apr. 11, 1922.
2 SHEETS—SHEET 2.

Witness:
Jacob Oberst Jr.

Daniel Herman Kleinschmidt, Inventor.
By Emil Neuhart
Attorney.

UNITED STATES PATENT OFFICE.

DANIEL HERMAN KLEINSCHMIDT, OF BUFFALO, NEW YORK.

EVAPORATING APPARATUS.

1,412,531.	Specification of Letters Patent.	Patented Apr. 11, 1922.

Application filed June 11, 1918. Serial No. 239,391.

*To all whom it may concern:*

Be it known that I, DANIEL HERMAN KLEINSCHMIDT, a citizen of the United States, residing at Buffalo, in the county of Erie and State of New York, have invented certain new and useful Improvements in Evaporating Apparatus, of which the following is a specification.

This invention relates to an evaporating apparatus.

The primary object of my invention is the provision of an evaporating apparatus having an internal rotatable member provided with heating elements.

Another object of my invention is the provision of an evaporator in which the heating elements are individually removable therefrom so that repairs can be made and heating elements substituted without disassembling any of the parts, the tubes being removable through an opening provided in the evaporating casing.

Another object of my invention is the provision of an evaporator having heating elements individually removable therefrom, the whole being so arranged that the heating capacity of the evaporator may be increased by the substitution of longer heating elements for any or all of those within the apparatus.

A further object of my invention is to so arrange the heating elements that they serve to create a circulation of the liquid material in the apparatus and so that all the heating elements are constantly changing their positions during the rotation of the part carrying the same, thus preventing the material adhering to the tubes and encrusting thereon, which would greatly affect the efficiency of the apparatus.

A further object of my invention is the provision of a support including a thrust-bearing on which the entire weight of the rotatable portion of the apparatus is carried.

A still further object is to so construct the apparatus that when a still further increase in capacity is desired over that permitted by the height of the casing, an additional section or sections may be added to the top of the casing and new heating elements or extensions of the heating elements, and extensions of the air tubes in said heating elements may be applied.

With these and other objects to appear hereinafter, the invention consists in a vertical evaporator having a rotatable heating member provided with heating elements arranged to cause the circulation of the liquid material within the apparatus.

It also consists in an evaporator having heating elements individually removable so that new elements may be substituted therefor, either of same length or of greater length, as may be desired.

It also consists in providing the evaporator casing with openings at different points in its height so that heating elements of different lengths may be conveniently placed within the apparatus and as readily removed therefrom.

It also consists in providing an internal heating member having tubular heating elements so arranged that any one will be readily accessible from the exterior through an opening in the casing of the apparatus.

It further consists in the novel features of construction and in the arrangement and combination of parts to be hereinafter described and more particularly pointed out in the subjoined claims.

In the drawings:—

Fig. 1 is a central vertical section through my improved apparatus.

Fig. 2 is an enlarged vertical section taken through one-half of a portion of the rotatable heating member, the heating elements being broken away between their ends.

Fig. 3 is an enlarged vertical section through a portion of the steam inlet-pipe showing the air-vent pipe entered therein and the water trap for the water of condensation.

Figure 4:
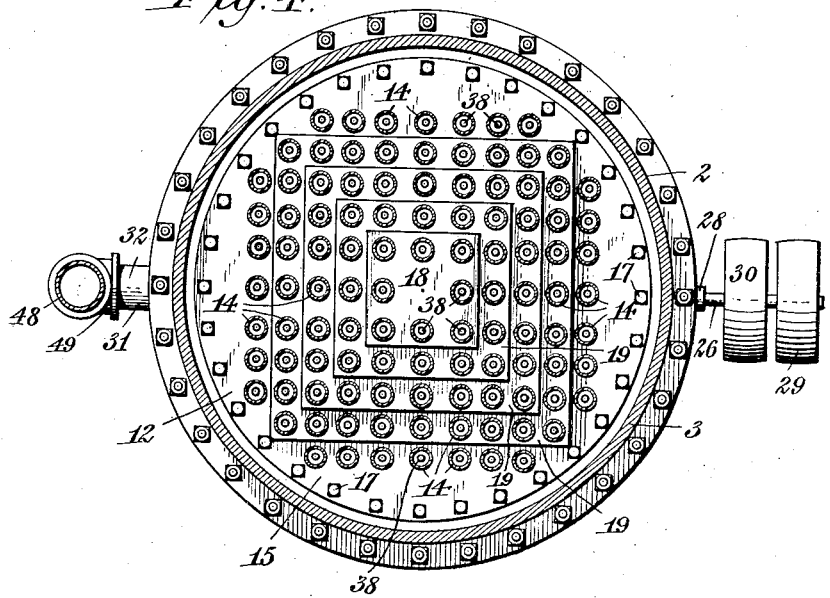
Fig. 4 is an enlarged horizontal section taken on line *a—a*, Fig. 1.
Figure 5:
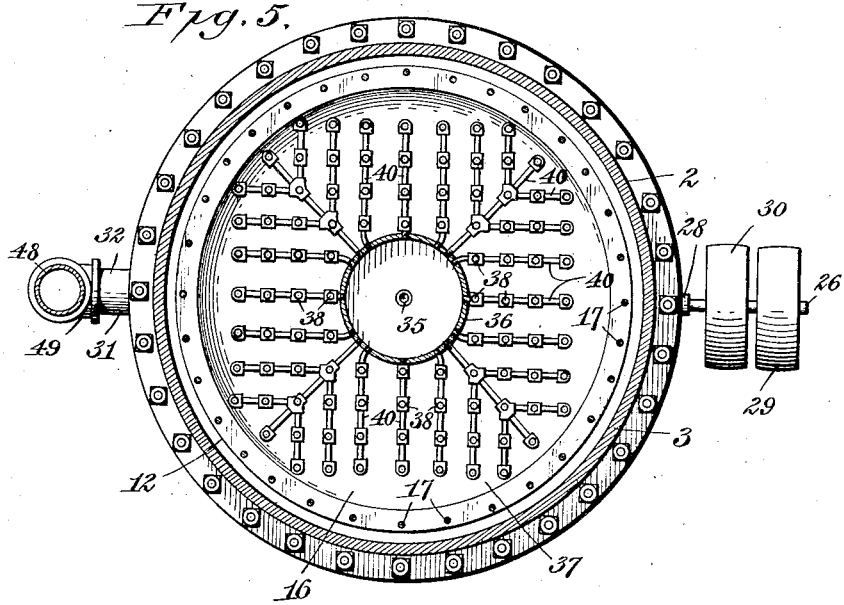
Fig. 5 is an enlarged horizontal section taken on line *b—b*, Fig. 1.

Referring now to the drawings in detail, the reference numeral 1 designates the frame on which the evaporator 2, considered as a whole, is supported.

The evaporator has a casing 3 which is preferably cylindrical in cross section but which may be otherwise shaped if desired. The bottom 4 of said casing is dished toward the center and at its central portion is provided with a stuffing box 5. Said casing also has a removable top 6 which is held to the top of the body portion of the casing by means of bolts 7 passing through the marginal portion of said top, and an outstanding flange 8 formed at the upper end of said body portion. The casing is provided with an opening 9 about midlength thereof and a second opening 10 is provided a distance from the first opening 9, both openings being closed in a water and vapor-tight manner.

11 designates the rotatable heating member which comprises a two-part hollow head 12 having a depending tube 13 and a plurality of heating elements 14, the upper part 15 of said head being bolted to the lower part 16 by means of bolts 17. The lower part of said head is dished toward the axis of said tube 13 while the upper portion is formed somewhat conical and is stepped to provide the flat upper central portion 18 and the ledges 19 arranged in successively lower planes.

The heating elements 14 are preferably in the form of pipes or tubes threaded at their lower ends into the upper part 15 of the hollow head 12 and having caps 20 threaded onto their upper ends to completely close the same. The hollow head 12 serves as a steam chest or chamber, and the depending tube 13 thereof is passed through the stuffing box 5 arranged centrally on the under side of the bottom 4 of the casing; thus leakage of the material in the casing along the depending tube is prevented. The lower end of the depending tube is journaled in a bearing 21 formed on a cross member 22 of the frame 1.

Resting upon the bearing 21 is an antifriction thrust-bearing 23 on which rests the hub of a bevel wheel 24, keyed or otherwise fastened to the depending tube. This bevel wheel is in mesh with a bevel pinion 25 fastened to a drive shaft 26 journaled in bearings 27, 28 carried, respectively, by the bottom 4 of the casing and the frame 1.

Keyed or otherwise secured to the drive shaft 25 is a drive pulley 29, and a loose pulley 30 is mounted on said shaft so that by suitable means, a belt passing around the drive pulley may be moved onto the loose pulley when it is desired to stop rotation of the rotatable member 11.

31 designates the steam inlet-pipe having a horizontal portion 32 and a vertical portion 33, the latter having its axis coincident with that of the depending tube 13 and being entered into the lower end thereof, a stuffing box 34 being provided at said lower end to render the connection at this point water and vapor-tight.

Extending upwardly through the vertical portion 33 of said steam inlet-pipe is an air vent-pipe 35 which is threaded at its upper end into a manifold or air chamber 36 arranged within the steam chamber 37 formed by said hollow head 12. Extending upwardly into the tubular heating elements 14 are air pipes 38, one air pipe being arranged in each heating-element and terminating a short distance from the upper end thereof, as at 39. The majority of these air pipes 38 are connected to horizontal air pipes 40 which enter the sides of the air chamber 36. The air pipes 38 entering the tubular heating elements connected to the flat upper central portion 18 of the steam chamber are connected directly with the air chamber through the top thereof. This arrangement may, however, be changed without departing from the principle involved. The air chamber 36 and the air pipes 38 and 40 are of course rotatable with the heating member 11, and for this purpose said air chamber is supported on lugs 41 extending upwardly from the bottom of the hollow head 12.

The air vent pipe 35 has a vertical part 42 passed axially through the depending tube 13 and through the vertical portion 33 of the steam inlet pipe, said vertical pipe 42 being rotatably secured at its lower end in an elbow fitting 43 fastened to a horizontal part 44 of said air vent pipe. In this manner the vertical part of said air vent pipe may rotate with the air chamber 36 and its connected pipes 38 and 40 and with the heating member 11.

The horizontal portion 32 of the steam inlet pipe is connected to the vertical portion 33 by a suitable fitting 46, such as an elbow, for instance. This fitting or elbow is especially formed to provide an interior up-turned elbow 47 of smaller diameter than the fitting 46, and also of smaller diameter than the vertical portion 33 of the steam inlet pipe threaded into said fitting. The interior elbow 47 serves as a guard to prevent admission of the water of condensation into the horizontal portion 32 of the steam inlet pipe and forms a water trap within said fitting. In the particular form shown, the horizontal portion 32 of the steam inlet pipe is connected to a vertical portion 48 by an elbow 49 and threaded into the bottom of said elbow 49 is a drip pipe 50 for the water of condensation that may lodge in said elbow.

The liquid material to be evaporated is delivered into the casing through an inlet or supply pipe 51, and a suitable gauge (not shown) may be applied to the casing to show the height of the material therein.

It is to be noted that the heating elements are arranged in parallel rows and in sets of square formation, one set being threaded into the upper flat central portion 18 of the steam chamber and a set into each of the ledges 19; consequently, upon rotating the heating member these heating elements or tubes act as agitators to keep the liquid material within the casing in circulation. The center of the heating member is free of heating elements and there is therefore no possibility of the liquid becoming encrusted upon any of these elements. The efficiency of the apparatus is therefore maintained at all times. It is of course apparent that the air chamber 36 and the pipes connected therewith rotate with the heating member. The steam enters the depending tube 13 from the inlet pipe 31 and passes up into the steam chamber 37 and from the latter into the heating elements or tubes 14. The steam chamber 37 and the heating elements or tubes 14 serve to heat the liquid material within the casing, the water of condensation passing down through the depending tube 13 and into the elbow 46 where it escapes through a drain pipe 52.

When starting the apparatus into action, the steam entering the same, forces the air out of the heating elements or tubes 14 into the air pipes 38, from the latter into the air chamber 36, and from the air chamber through the air-vent pipe 35. After the apparatus is in operation, a valve 53 in the pipe 35 may be closed so as to avoid the escape of steam therethrough. The liquid material within the casing may be withdrawn through a pipe 54 threaded into the bottom of said casing.

It is to be noted that the inner set of heating elements or tubes reach a higher plane than the remaining sets, the several sets gradually terminating in lower planes outwardly so that when any tube of any of the sets leaks or becomes damaged, it may be easily unthreaded from the hollow head or steam chamber and be withdrawn through the opening 9. By having the heating elements or tubes of the different sets terminating at their upper ends in different horizontal planes, any pipe is readily accessible for removal through said opening and another pipe may be easily substituted for the pipe removed.

By providing the casing with the opening 10, heating elements or tubes of substantially double the length of those shown, may be used. Increased lengths of tubes may be substituted for those shown, or short sections of tubes may be connected by means of sockets to the upper ends of those shown and the upper ends of the short sections capped. When pipes of greater length than those shown are used, they may be inserted into the casing through the opening 10, and if any becomes worn or for any other reason requires repairing, any of the pipes may be unthreaded from the hollow head or steam chamber and withdrawn through the upper opening 10, after which a new pipe may be substituted by inserting the same through said upper opening.

When treating substances which tend to foam when heated, it may be desirable to have the heating elements extend to points in close proximity to the top of the casing, so that the foam portion becomes thoroughly heated. When thus arranged, it will be found impracticable to remove worn or leaky tubes through the upper opening 10, and with a view of retaining this feature of my invention, a hand hole 55 is provided in the top of the casing which is closed by a cover 56 bolted or otherwise fastened to said top.

Under all conditions of use, a vapor escape pipe 57 is connected to the top of the casing which is adapted to be led to the condenser, according to already known arrangements, or to another evaporator unit or units having connection with a condenser.

Having thus described my invention, what I claim is:—

1. An evaporating apparatus, comprising a vertical casing having a pair of spaced openings arranged one above the other, a rotatable hollow member within said casing, means for introducing steam into said hollow member from the exterior of said casing, and a plurality of vertically-disposed tubes removably secured into said hollow member and in communication with the interior thereof, any or all of said tubes being removable through the lower of said openings to enable the substitution of tubes of similar length through said opening, or of greater length through the upper of said openings.

2. An evaporating apparatus, comprising a casing, a rotatable heating member within said casing, a stationary steam inlet pipe having connection with said rotatable heating member, and a rotatable air escape device within said rotatable member and extending through a portion of said steam inlet pipe.

3. An evaporating apparatus, comprising a vertical casing, a hollow rotatable member within said casing having upwardly extending heating tubes arranged in sets of square formation, means for rotating said rotatable member from the exterior of said casing, air escape pipes extending into said tubes, a manifold arranged within said hollow member and rotatable therewith to which said tubes are connected, and an air escape pipe extending from said manifold outwardly.

4. An evaporating apparatus, comprising a vertical casing, a rotatable heating member within said casing having ledges on its upper face arranged in different horizontal planes, a plurality of sets of heating tubes threaded into said heating member, each set of said tubes entering said head at a different ledge, means for rotating said heating member from the exterior of the casing, and means to permit the escape of air from said heating tubes and heating member when introducing the heating medium thereinto.

5. An evaporating apparatus, comprising a vertical casing, a hollow head within said casing having a lower part provided with a depending tube extending downwardly through the bottom of said casing and an upper part secured to said lower part, tubes threaded into said upper part, a manifold within said hollow head having air pipes connected thereto which extend upwardly into said tubes, an air vent pipe passing through said depending tube and connected to said manifold, a steam pipe, connected to said depending tube in a manner to permit rotation of said tube, and driving mechanism for rotating said tube, the parts of the heating member carried thereby and said manifold and air-pipe.

6. An evaporating apparatus, comprising a vertical casing, a rotatable heating member within said casing having a depending tube extending through the bottom of said casing, a steam inlet pipe so connected to the lower end of said tube as to permit rotation of said tube, an air pipe extending through said tube and through a portion of said steam inlet pipe and having a portion thereof rotatable with said tube.

7. An evaporating apparatus, comprising a vertical casing having a stuffing-box arranged axially in the bottom thereof, a rotatable heating member within said casing having a depending hollow portion extending downwardly through said stuffing box, a stuffing-box at the lower end of said depending hollow portion, a steam inlet pipe including an elbow fitting, said inlet pipe having one end passed through said last-mentioned stuffing box and entered into the lower end of said depending hollow portion, said elbow fitting having a water trap therein, an air pipe extending upwardly through said depending hollow portion and through a portion of said steam inlet pipe including said fitting, and a drip pipe for the water of condensation.

8. An evaporating apparatus, comprising a vertical casing, a rotatable heating member within said casing having a depending hollow portion provided with a stuffing-box at its lower end, a steam inlet pipe having a vertical portion extending through said stuffing box and entered into said depending hollow portion, said steam inlet pipe having also a horizontal portion and a fitting connecting said horizontal portion with said vertical portion, said fitting having an upwardly opening curved internal portion serving as a continuation of said horizontal portion and being spaced from the wall of said vertical portion and from the wall of said fitting to provide a water trap in said fitting, and a drip pipe connected to said fitting for the escape of the water of condensation lodging in said trap.

9. An evaporating apparatus, comprising a vertical casing, a heating member rotatable within said casing and having a depending hollow portion extending through the bottom of said casing, a steam inlet pipe including an L-shaped fitting and having one end thereof connected to the lower end of said depending hollow portion to permit rotation of the latter, and an air vent pipe comprising a vertical portion extending through said depending hollow portion and through a portion of said steam inlet pipe and a horizontal portion connected to said vertical portion to permit rotation of the latter.

10. An evaporating apparatus, comprising a casing, a hollow head rotatable in said casing and a plurality of heating tubes secured to said head, said tubes being arranged in sets with the tubes of each set terminating at their upper ends in a different horizontal plane than those of the other set or sets.

11. An evaporating apparatus, comprising a vertical casing, and a heating element rotatable within said casing and having upstanding tubes arranged around an open center, said tubes being arranged in parallel rows forming sets of square formation and having one set surrounding another.

In testimony whereof I affix my signature.

DANIEL HERMAN KLEINSCHMIDT.